(12) United States Patent
Brenner et al.

(10) Patent No.: US 7,448,036 B2
(45) Date of Patent: Nov. 4, 2008

(54) SYSTEM AND METHOD FOR THREAD SCHEDULING WITH WEAK PREEMPTION POLICY

(75) Inventors: Larry Bert Brenner, Austin, TX (US); Mysore Sathyanarayana Srinivas, Austin, TX (US); James W. Van Fleet, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1329 days.

(21) Appl. No.: 10/138,890

(22) Filed: May 2, 2002

(65) Prior Publication Data

US 2003/0208521 A1 Nov. 6, 2003

(51) Int. Cl.
*G06F 9/46* (2006.01)
(52) U.S. Cl. ................................... 718/103
(58) Field of Classification Search .......... 709/207; 718/103
See application file for complete search history.

(56) References Cited

U.S. PATENT DOCUMENTS

| | | | |
|---|---|---|---|
| 5,301,324 A * | 4/1994 | Dewey et al. ............. 718/105 |
| 5,428,789 A | 6/1995 | Wardron, III ............. 395/700 |
| 5,937,187 A | 8/1999 | Koshe et al. ............. 395/674 |
| 5,999,963 A | 12/1999 | Bruno et al. ............. 709/104 |
| 6,038,516 A * | 3/2000 | Alexander et al. ......... 702/67 |
| 6,085,215 A | 7/2000 | Ramakrishnan et al. ..... 709/102 |
| 6,108,683 A | 8/2000 | Kamada et al. ............ 709/103 |
| 6,157,963 A | 12/2000 | Courtright, II et al. .......... 710/5 |
| 6,182,120 B1 | 1/2001 | Beaulieu et al. ............. 709/207 |
| 6,205,150 B1 | 3/2001 | Ruszczyk .................... 370/412 |
| 6,212,562 B1 | 4/2001 | Huang ....................... 709/227 |
| 6,223,204 B1 | 4/2001 | Tucker ...................... 709/103 |
| 6,253,225 B1 | 6/2001 | Nakahara et al. ............ 709/100 |
| 6,263,364 B1 | 7/2001 | Najork et al. ............... 709/217 |

OTHER PUBLICATIONS

Wang et al, Scheduling Fixed-Priority Tasks with Preemption Threshold, Real-Time Computing Systems and Applications, 1999. RTCSA '99. Sixth International Conference on.*

Macon, Jr. et al., "Deterministic Priority Inversion Method for Personal Computers," IBM Technical Disclosure Bulletin, vol. 38, No. 5, May 1995.

* cited by examiner

*Primary Examiner*—Meng-Ai An
*Assistant Examiner*—Eric C Wai
(74) *Attorney, Agent, or Firm*—Van Leeuwen & Van Leeuwen; Casimer K. Salys (57) ABSTRACT

A system and method for thread scheduling with a weak preemption policy is provided. The scheduler receives requests from newly ready work. The scheduler adds a "preempt value" to the current work's priority so that it is somewhat increased for preemption purposes. The preempt value can be adjusted in order to make it more, or less, difficult for newly ready work to preempt the current work. A "less strict" preemption policy allows current work to complete rather than interrupting the current work and resume it at a later time, thus saving system overhead. Newly ready work that is queued with a better priority than the current work is queued in a favorable position to be executed after the current work is completed but before other work that has been queued with the same priority of the current work.

6 Claims, 5 Drawing Sheets

SYSTEM AND METHOD FOR THREAD SCHEDULING WITH WEAK PREEMPTION POLICY

BACKGROUND OF THE INVENTION

1. Technical Field

The present invention relates in general to a system and method for scheduling processes requiring service, e.g., processes arising in multitasking operating systems or data communication links. More particularly, the present invention relates to a system and method for determining whether to preempt a current job, e.g., thread, in favor of a newly ready job with a better priority.

2. Description of the Related Art

The operating system is arguably the most important program that runs on a computer. Every general-purpose computer has an operating system in order to run other programs. Operating systems perform basic tasks, such as recognizing input from the keyboard, sending output to the display screen, keeping track of files and directories, and controlling peripheral devices such as disk drives and printers.

For large systems, such as a UNIX™ based operating system, the operating system has even greater responsibilities and powers. It makes sure that different programs and users running at the same time do not interfere with each other.

Operating systems provide a software platform on top of which other programs, called application programs, can run. The application programs are usually written to run on top of a particular operating system. The choice of which operating system to use, therefore, determines to a great extent the applications that can run.

The operating system often includes a "kernel." As the name implies, the kernel is at the core of the operating system and is loaded each time the system is started, also referred to as a system "boot." The kernel manages the resources of the system, presenting them to the users as a coherent system. The user does not have to understand much, if anything, about the kernel in order to use the computer system. The kernel provides various necessary functions in the operating environment. The kernel manages the system's memory and allocates it to each process. It takes time for the kernel to save and restore the program's state and switch from one program to the next (called dispatching). This action needs to execute quickly because time spent switching between programs takes away from the time available to actually run the users' programs. The time spent in the "system state" where the kernel performs tasks like switching between user programs is the system overhead and should be kept as low as possible.

The kernel also schedules the work to be done by the central processing unit, (also called "CPU" or "processor") so that the work of each user is carried out efficiently. The kernel transfers data from one part of the system to another. Switching between user programs in main memory is also done by the kernel. One challenge facing traditional systems is efficiently running user programs so that the system overhead is minimized and more CPU time is spent running user programs.

Programs include one or more processes that are individually executed by the processor. As used herein, the terms "task," "process," "thread," "job," "program," and "work" are used interchangeably to describe sets of instructions that are performed by the processor. Processes have priorities that determine their relative accessibility to a processor. One component of the kernel is the scheduler. As its name implies, the scheduler determines, based on priority, the order in which jobs are serviced by the processor (or processors in a multi-processor system). A single processor can perform only one computer instruction at a time. But, because it can be interrupted, the processor can take turns in which programs or sets of instructions that it performs. An operating system usually has some code that is called an interrupt handler. The interrupt handler makes waiting work ready to run as the events delaying that work occur. This newly ready work is then stored in one or more queues where ready work waits until it is its turn to run based on its priority.

Preemptive multitasking is used to determine how long to allocate to any one process before giving another process a turn to use the operating system. The act of taking control of the operating system from one task and giving it to another task is called "context switching" which is triggered when one process "preempts" another process according to a priority algorithm used by the operating system. In addition, context switching occurs when a process uses its allotted processor time and is "time sliced" so that other processes can receive service from the processor. In some operating systems, some applications can be given higher priority than other applications, giving the higher priority programs preferential treatment by the scheduler as compared with lower priority programs. Time slicing and the priority algorithm in place in the operating system determine how much processor time any thread receives, subject to preemption by better priority threads.

In traditional systems that preempt based upon priority, a job with more favored priority preempts a job that is currently being serviced with a less favorable priority. One challenge caused by preempting jobs is the overhead needed by the system to interrupt the work currently being performed, queue the work to a queue managed by the scheduler, and start processing the job with the more favored priority. This increased overhead, in turn, can affect the overall performance and throughput of the computer system.

What is needed, therefore, is a system and method for providing a "less strict" preemption policy whereby a currently running job is not preempted when the newly ready work has a slightly higher priority, yet still allows newly ready work with a substantially higher priority to preempt the currently running job.

SUMMARY

It has been discovered that overall system performance may be improved by applying a "less strict" preemption policy. The scheduler receives requests from newly ready work (i.e., a thread) that requires service from a processor. Rather than simply comparing the priority of the newly ready work to the work that is currently being serviced by the processor, the scheduler adds a "preempt value" to the current work so that its priority is somewhat increased for preemption purposes. The system administrator can change the preempt value in order to change the treatment of the current work regarding preemption. In this way, the system administrator can make it more, or less, difficult for newly ready work to preempt the current work.

Having a "less strict" preemption policy allows some current work to complete rather than having to interrupt the current work and resume it at a later time. Avoiding interruption of work currently being performed saves system overhead by allowing the system to complete a current job under certain circumstances.

Newly ready work that does preempt the current work depends upon the "preempt value" set by the system administrator. The "preempt value" can be seen as the amount of priority difference between the current work and the newly ready work that is needed before the scheduler preempts the current work. This differs from traditional systems wherein the current work is preempted whenever newly ready work is received with a better (i.e., more favored) priority without regard to the difference between the priority of the current work and that of the newly ready work. For example, in a system where jobs with lower priority numbers are favored over jobs with higher priority numbers (such as IBM's AIX™ operating system) and the "preempt value" is set to 0, then the scheduler preempts the current job whenever the newly ready job's priority is lower than that of the current job. However, when the "preempt value" is set to 1 then a newly ready job with a priority of 50 will not preempt a current job with a priority of 51, but any newly ready jobs with priorities of 49 or lower will preempt the current job because the difference in priorities is greater than 1 (the preempt value). Increasing the preempt value to 2 would only allow newly ready jobs with priorities of 48 or lower to preempt the current job. Raising the preempt value, therefore, makes it more difficult for higher priority newly ready work to preempt the work that is currently being processed.

Newly ready work that has a greater priority than the current work, but not great enough to preempt the current work, is queued in a favorable position so that it will be executed by the processor after the current work is completed but before other work that has been queued with the same priority as the current work. For example, if a newly ready job has a "high" priority that is not high enough to preempt the "normal" priority job that is currently running, then the high priority job is queued in a favorable position ahead of other "normal" priority jobs that are waiting to be executed. The high priority job would therefore be executed before the queued normal priority jobs. If multiple high priority jobs are queued while the normal priority job is running, then the high priority jobs are run in the order in which they arrived (or were readied).

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description. As used herein, the terms "task," "process," "thread," "job," "program," and "work" are used interchangeably to describe work that is performed by the processor.

Figure 1:
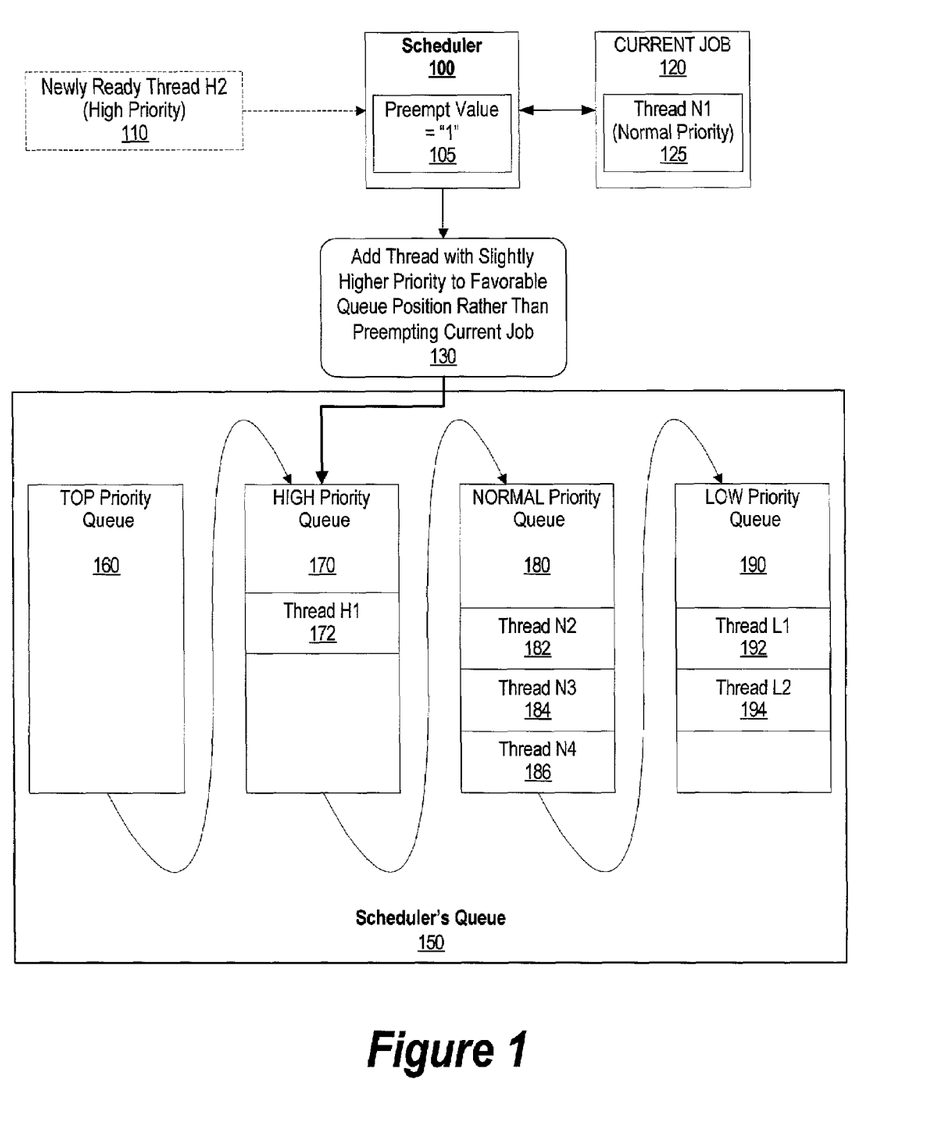
FIG. 1 is a diagram showing a scheduler queuing a high priority job to be executed after a normal priority job has completed.

FIG. 1 is a diagram showing a scheduler queuing a high priority job to be executed after a normal priority job has completed. Scheduler 100 is a software component within an operating system, such as IBM's AIX™ operating system, that determines which job receives processor time (i.e., runs, is executed, etc.) and which jobs should be queued (i.e., wait for the processor to become available).

In the example shown in FIG. 1, newly ready High Priority Thread H2 (110) is requesting service by the processor (or processors) supported by scheduler 100. Scheduler 100 compares the priority of the newly ready thread to the priority of current job 120 being executed by the processor. In the example shown, Normal Priority Thread N1 (125) is currently being serviced by the processor. In a traditional system that uses preemption, the newly ready thread would preempt the currently running thread if the newly ready thread's priority is more favorable than the current running thread's priority with the idea that more favored jobs (i.e., threads) should run before less favored jobs.

Scheduler 100, however, is programmed to be "less strict" about preempting in certain situations so that the current job has a better chance of finishing, thereby saving system resources needed to stop executing the current job, queue the current job, and then re-execute the current job when the scheduler reaches the job in the queue. In the example shown, four different priorities are available, "top," "high," "normal," and "low." The system administrator can adjust the preempt-ability of the current job in order to make it easier or more difficult for newly ready work to preempt the current job. In example shown in FIG. 1, the preempt-ability value has been set to "1". Because of this setting, newly ready work will have to be at least two priority levels greater than the current job's priority in order to preempt the current work. The current job is a "normal" priority, therefore a "high" priority job will not preempt it and will be queued in a favorable position as compared to other threads with the same priority as the currently running thread ("normal"). Queuing the newly ready "high" priority job is performed rather than preempting the currently running "normal" priority job. However, if a "top" priority job is made ready, that job's priority is more than 1 priority level greater than the current job and will cause the current job to be preempted. When the currently running thread completes (or is time sliced), the scheduler will schedule the highest priority job that has been queued (i.e., a queued "high" priority thread will be readied before a queued "normal" priority thread).

Process 130 determines that the newly ready thread does not have sufficient priority to preempt the current job (even though the newly ready thread's priority is more favored than the currently running thread's priority), and consequently queues Thread H2 (110) into High Priority Queue 170. In order to provide threads with favorable queue positions, the scheduler's queue is divided so that each priority has its own queue: Top Priority Queue 160, High Priority Queue 170, Normal Priority Queue 180, and Low Priority Queue 190.

In the example shown, Top Priority Queue 160 is empty. This situation is expected because with the preempt-ability value set to "1", any top priority jobs would have preempted the currently running normal priority job. High Priority Queue 170 is shown with one job (Thread H1 (172)) already waiting in the queue. Evidently, Thread H1 (172) arrived before Newly Ready Thread H2 (110) and, because it was unable to preempt the current job because of the preempt-ability setting, it was queued in High Priority Queue 170. Therefore, Newly Ready Thread H2 (110) will be queued just after Thread H1 (172) in High Priority Queue 170.

When the current job completes (or is time sliced), the scheduler takes the highest priority thread that is waiting in scheduler queue 150. The scheduler starts searching at the highest priority queue (Top Priority Queue 160) and searches until a job is waiting in one of the queues. In the example shown in FIG. 1, Top Priority Queue 160 is empty, so the scheduler would move to the next highest priority queue (High Priority Queue 170). High Priority Queue 170 includes High Priority Thread H1 (172) and High Priority Thread H2 (110), which was added to the queue as described above. After Threads 172 and 110 are serviced by the processor, the High Priority Queue is empty so the scheduler checks the next highest queue (Normal Priority Queue 180). The jobs in this queue (Normal Priority Threads N2 (182), N3 (184), and N4 (186)) are serviced by the processor in the order shown (i.e., N2 followed by N3 followed by N4). When the jobs in all other queues have been processed (i.e., queues 160, 170, and 180 are all empty), the scheduler processes the jobs in the last (lowest priority) queue (Low Priority Queue 190). These jobs include Low Priority Threads L1 (192) and L2 (194). Of course, if newly ready work become available with higher priorities, such as additional high priority threads, these jobs will be scheduled accordingly (i.e., the newly ready work will preempt the current work if the newly ready work's priority is high enough or the work will be queued in the queue corresponding to its priority and run according to the schedule outlined above).

Figure 2:
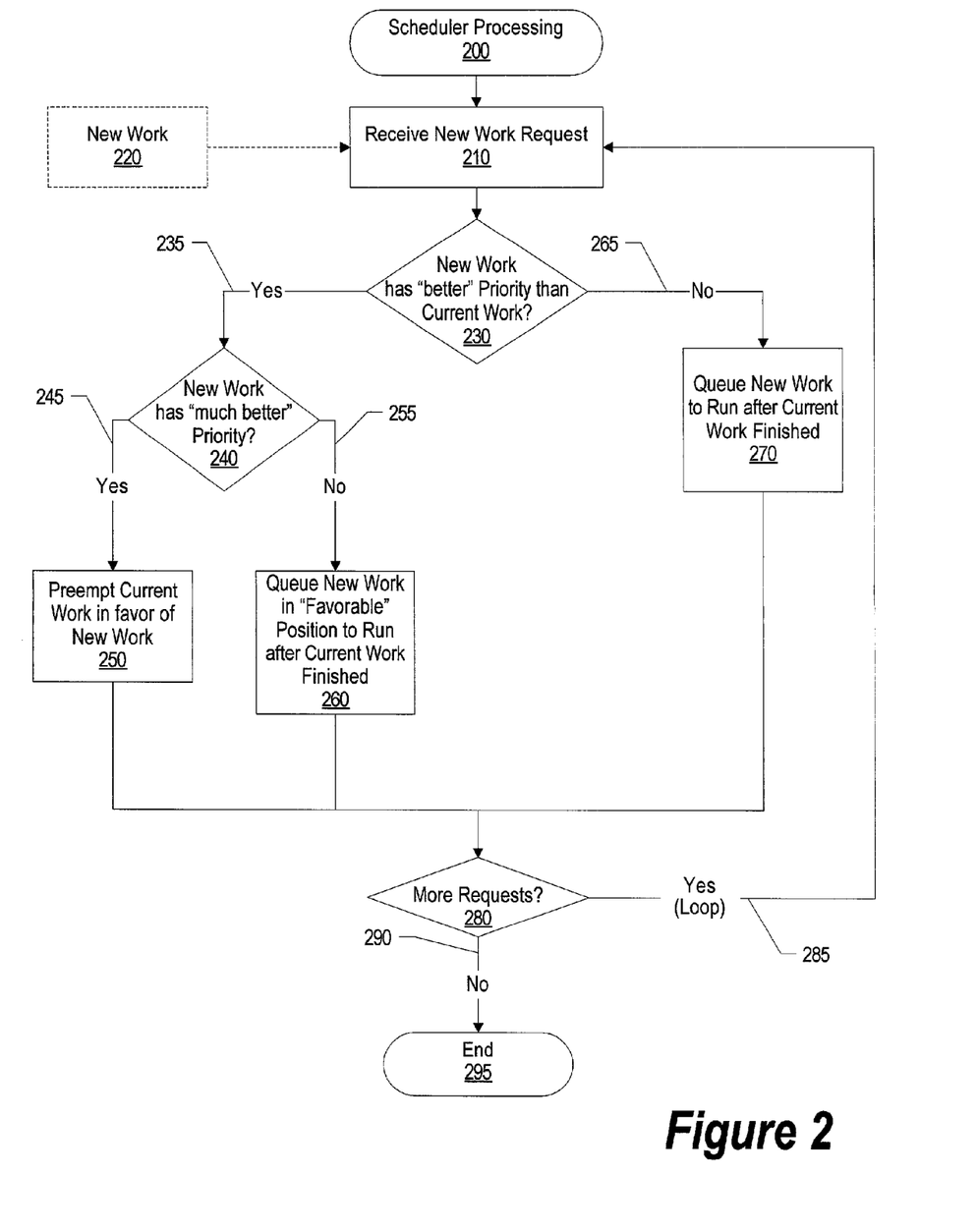
FIG. 2 is a flowchart showing the steps taken by a scheduler in determining whether to queue newly ready work or preempt the current work.

FIG. 2 is a flowchart showing the steps taken by a scheduler in determining whether to queue newly ready work or pre-empt the current work. Scheduler processing commences at 200 whereupon the scheduler receives a request (step 210) from newly ready work 220. The new work includes a priority. In some operating systems priority numbers that are low are treated more favorably by the scheduler than higher priority numbers. Conversely, in other operating systems, higher priority numbers are treated more favorably by the scheduler than low priority numbers.

A determination is made as to whether the new work has a "better" priority than the work that is currently being serviced by the processor (decision 230). If the new work's priority is less than or equal to the priority of the currently serviced work, decision 230 branches to "no" branch 265 whereupon the new work is queued to run sometime after the current work finishes (step 270). How long the new work will have to wait depends upon how much other work is waiting in the scheduler's queue and how the new work's priority compares to the priorities of the work that is waiting in the queue.

On the other hand, if the new work does have a "better" priority than the work that is currently being serviced by the processor, decision 230 branches to "yes" branch 235 whereupon a determination is made as to whether the new work has a "much better" priority than the work currently being serviced by the processor (decision 240). Whether one priority is considered "much better" than another priority depends upon the preempt-ability value set by the system administrator. If the preempt-ability value is set low, e.g., set to "1", then the new work does not have to have a much greater priority in order to preempt the work currently being serviced by the processor. Likewise, if the value is set high, then the new work will need a correspondingly greater priority in order to pre-empt the work currently being serviced by the processor.

If the new work has a "much better" priority, then decision 240 branches to "yes" branch 245 whereupon the scheduler preempts the work currently being serviced by the processor so that the new work can be serviced immediately by the processor (step 250). The preempted job is then queued according to its priority. On the other hand, if the new work does not have a "much better" priority, then decision 240 branches to "no" branch 255 whereupon the new work is queued in a favorable position to run after the current work is serviced by the processor (or is time sliced). A favorable queue position would be a space in the queue ahead of jobs waiting that have less favorable priorities. In this manner, if a "normal" priority thread is currently being serviced by the processor and other normal priority threads are waiting in the queue, then a "high" priority thread that is not deemed "much better" in priority would be queued to be serviced before the queued normal priority threads.

After the new work has either been queued or preempts the work currently being serviced by the processor a determination is made as to whether there are additional incoming requests by newly ready work (decision 280). If there are more requests, decision 280 branches to "yes" branch 285 which loops back to process the next newly ready work. This looping continues until there are no more requests to process (e.g., the operating system is shut down), at which time decision 280 branches to "no" branch 290 and processing ends at 295.

Figure 3:
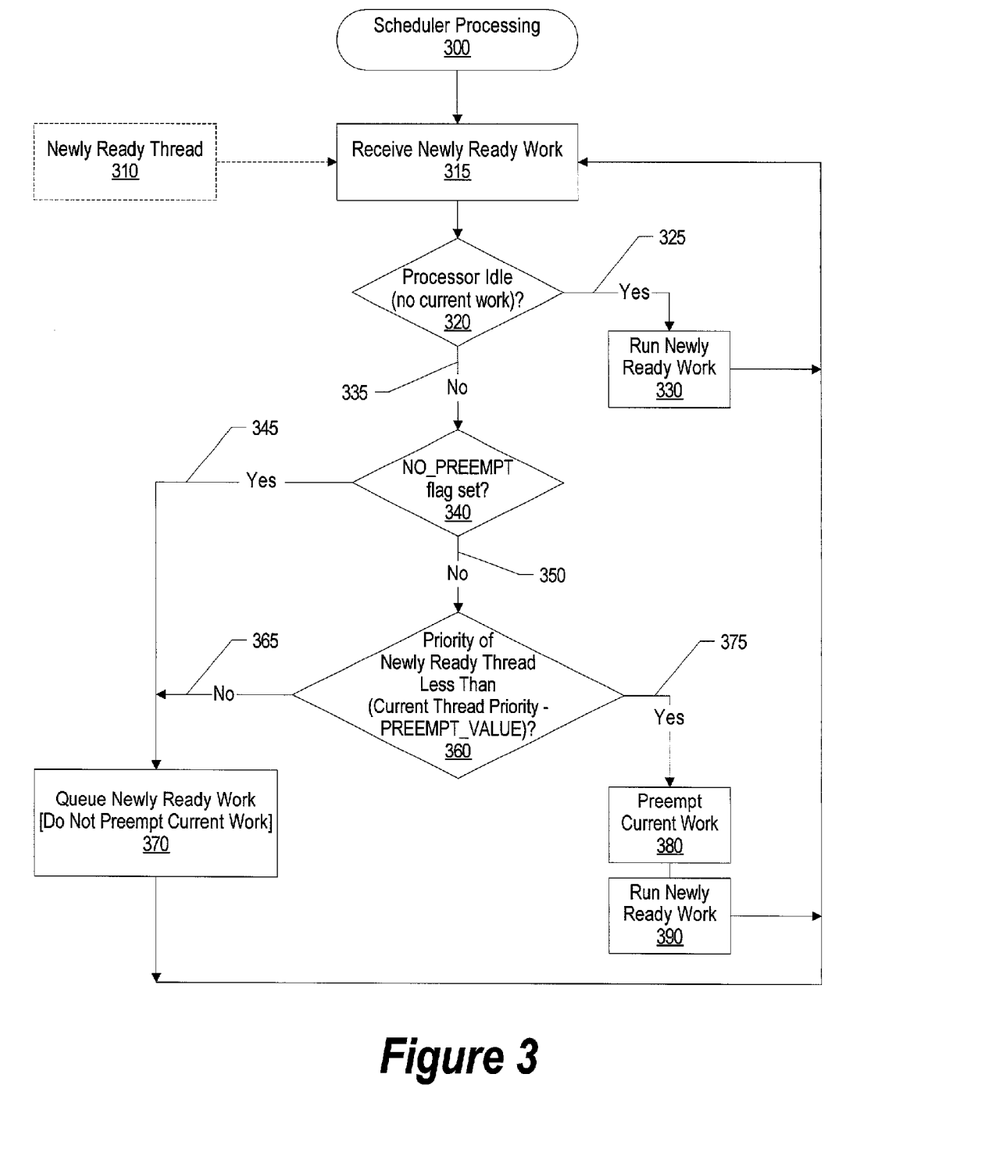
FIG. 3 is a flowchart showing the steps taken by a scheduler in a particular environment, such as IBM's AIX™ operating system, in determining whether to queue newly ready work or preempt the current work.

FIG. 3 is a flowchart showing the steps taken by a scheduler in a particular environment, such as IBM's AIX™ operating system, in determining whether to queue newly ready work or preempt the current work. In the environment depicted in FIG. 3, lower priority numbers are favored by the scheduler over higher priority numbers. For example, in a traditional system using the environment depicted in FIG. 3, a newly ready job with a priority number of "50" would preempt a job currently being serviced with a priority number of ""60."

Scheduler processing commences at 300 whereupon the scheduler receives a request from newly ready work 310 at step 315. The scheduler determines whether the processor is currently idle at decision 320 (i.e., no current work presently being serviced by the processor). If the processor is idle, decision 320 branches to "yes" branch 325 whereupon the scheduler schedules the newly ready work to be serviced by the processor immediately without regard to the priority of the newly ready work (step 330) and processing loops back to wait for the next newly ready work request (step 315).

On the other hand, if the processor is not idle (i.e., the processor is currently servicing another job), decision 320 branches to "no" branch 335 whereupon a determination is made as to whether the job currently being serviced has set a "NO PREEMPT" flag indicating that the current work should not be preempted (decision 340). If the NO PREEMPT flag is set, decision 340 branches to "yes" branch 345 whereupon the newly ready work is queued in the scheduler's queue according to the priority of the newly ready work. In one embodiment, the "NO PREEMPT" flag is set by a currently running thread so that a particular sleeping thread (or threads) will not preempt the current thread. This is typically performed in situations where the current thread holds a kernel lock and knows that the sleeping thread will request the same kernel lock. In this embodiment, the currently running thread continues running until it is completed since the sleeping thread (if awakened) will be forced back to sleep since the needed kernel lock is still being held by the currently running thread.

However, if the NO PREEMPT flag has not been set, decision 340 branches to "no" branch 350 whereupon a determination is made as to whether the priority of the newly ready work is less than the the priority of the work currently being serviced less a "PREEMPT VALUE" that was set by the system administrator (decision 360). The PREEMPT VALUE determines how much lower the priority of the newly ready work must be in comparison to the work currently being serviced before the newly ready work preempts the current work. For example if the PREEMPT VALUE is set to "1" and the priority of the current work is "52" and the priority of the newly ready work is "50", then the newly ready work will preempt the current work. However, if the PREEMPT VALUE is instead set to "2" then the same newly ready work will not preempt the current work because its priority ("50") is not less than the current work priority less the PREEMPT VALUE (i.e., 50 is not less than (52−2)).

If the priority of the newly ready work is not less than the priority of the work currently being serviced less the PREEMPT VALUE, decision 360 branches to "no" branch 365 whereupon the newly ready work is queued in the scheduler's queue according to the newly ready work's priority (step 370) and processing loops back to wait and receive the next newly ready work request (step 315). On the other hand, if the priority of the newly ready work is less than the priority of the work currently being serviced less the PREEMPT VALUE, decision 360 branches to "yes" branch 375 whereupon the current work is preempted (step 380) and queued in the scheduler's queue according to its priority and the newly ready work is serviced by the processor (step 390). Processing thereafter loops back to wait for and process the next request from newly ready work.

Figure 4:
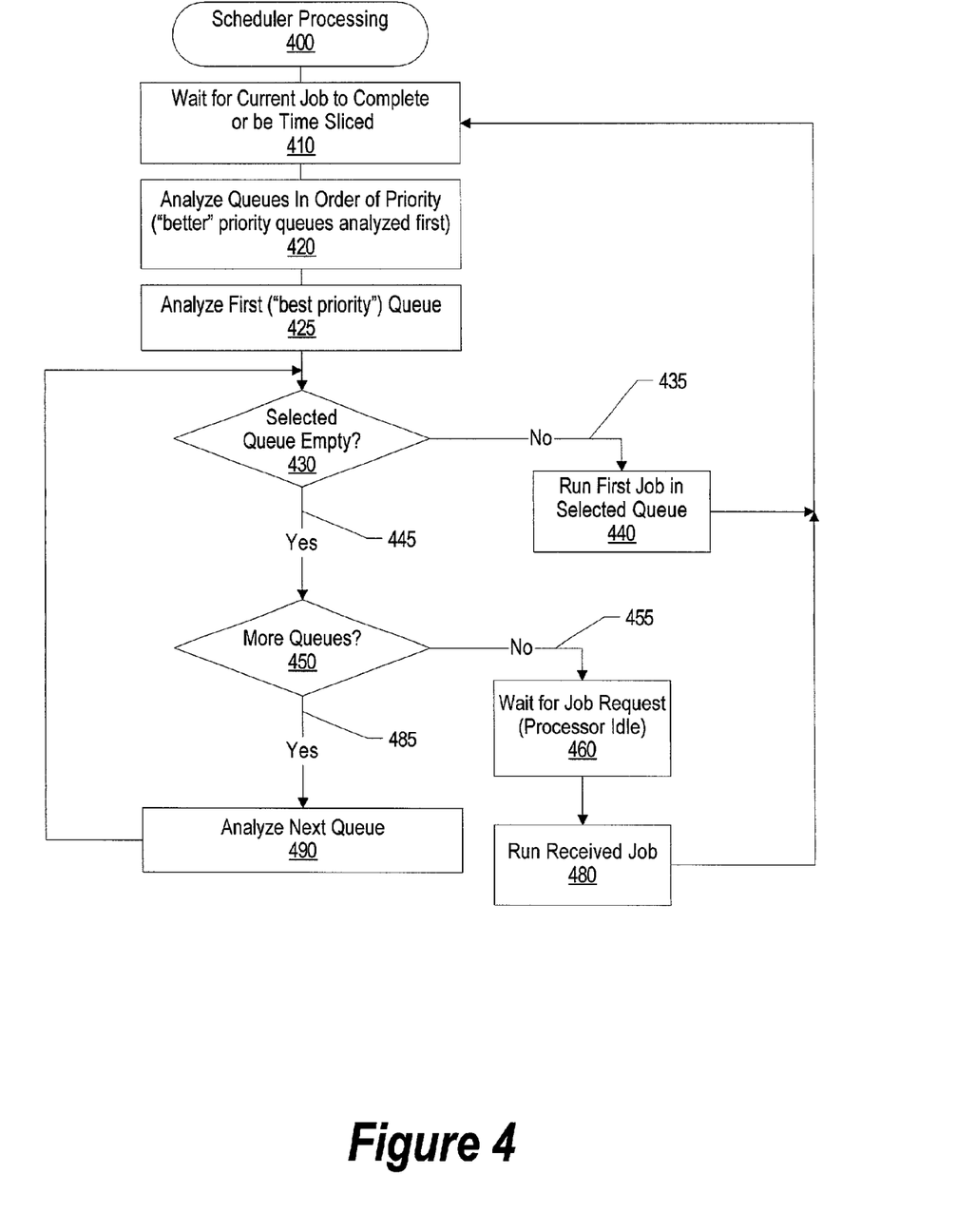
FIG. 4 is a flowchart showing the steps taken by a scheduler in selecting a queued job to execute after the current job has completed or been time sliced.

FIG. 4 is a flowchart showing the steps taken by a scheduler in selecting a queued job to execute after the current job has completed or been time sliced. Along with processing newly ready work, the scheduler also manages a queue of work that is waiting to be serviced by the processor. In the embodiment shown in FIG. 4, the scheduler's queue is divided into separate queues. Each of the separate queues include jobs of the same priority that are waiting to be serviced. For example, there may be five jobs with a "high" priority that are waiting in a "high priority queue" and three jobs waiting in a "normal priority queue." The scheduler services the queues according to priority so that the "better" waiting jobs (such as the waiting "high" priority jobs) are processed before less favorable waiting jobs (such as the waiting "normal" priority jobs).

Scheduler processing of queued items commences at 400 whereupon the scheduler waits for the job currently being serviced by the processor to complete or be time sliced (step 410). When the last job completes or is time sliced, the scheduler analyzes its queues in order of priority so that higher priority jobs are processed before lower priority jobs (step 420). The scheduler selects the first, or "best", priority queue (step 425).

A determination is made as to whether the selected queue is empty (decision 430). If the selected queue is empty, decision 430 branches to "no" branch 435 whereupon the scheduler pulls the first job from the selected queue and this job is serviced by the processor (step 440). Processing then loops back to wait for servicing of this job to complete or for the job to be time sliced (step 410).

On the other hand, if the selected queue is empty, decision 430 branches to "yes" branch 445 whereupon a determination is made as to whether there are additional queues to analyze (step 450). If there are additional queues left to process, decision 450 branches to "yes" branch 485 whereupon the next queue is selected (step 490) and processing loops back to analyze the next queue.

If there are no more queues to process, decision 450 branches to "no" branch 455 whereupon the scheduler waits for an incoming request from a newly ready job (step 460). When a new job is received, the job is serviced by the processor (step 480). Processing then loops back to wait for servicing of this job to complete or for the job to be time sliced (step 410).

Figure 5:
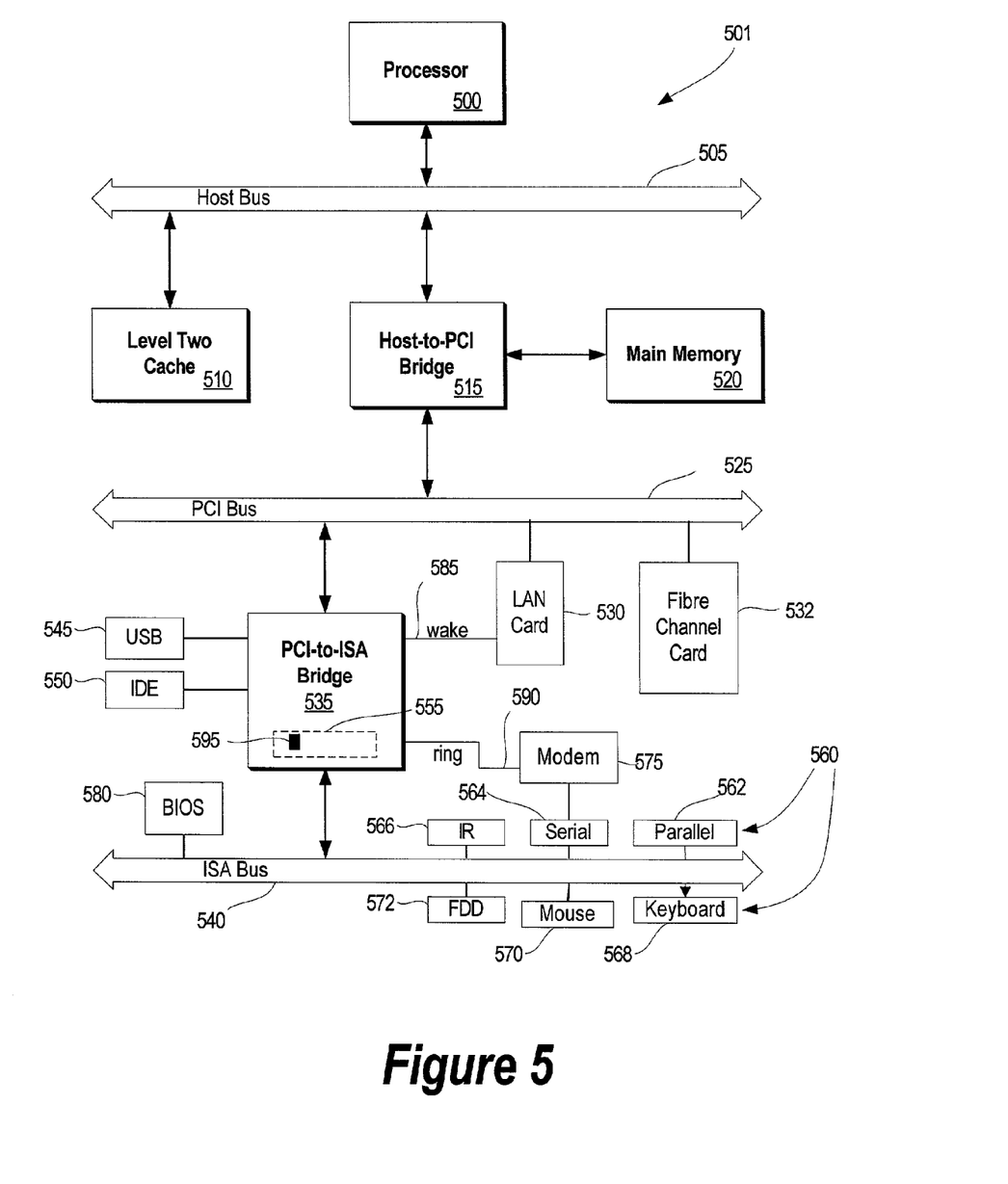
FIG. 5 is a block diagram of an information handling system capable of implementing the present invention.

FIG. 5 illustrates information handling system 501 which is a simplified example of a computer system capable of performing the operations described herein. Computer system 501 includes processor 500 which is coupled to host bus 505. A level two (L2) cache memory 510 is also coupled to the host bus 505. Host-to-PCI bridge 515 is coupled to main memory 520, includes cache memory and main memory control functions, and provides bus control to handle transfers among PCI bus 525, processor 500, L2 cache 510, main memory 520, and host bus 505. PCI bus 525 provides an interface for a variety of devices including, for example, LAN card 530. PCI-to-ISA bridge 535 provides bus control to handle transfers between PCI bus 525 and ISA bus 540, universal serial bus (USB) functionality 545, IDE device functionality 550, power management functionality 555, and can include other functional elements not shown, such as a real-time clock (RTC), DMA control, interrupt support, and system management bus support. Peripheral devices and input/output (I/O) devices can be attached to various interfaces 560 (e.g., parallel interface 562, serial interface 564, infrared (IR) interface 566, keyboard interface 568, mouse interface 570, fixed disk (HDD) 572, removable storage device 574) coupled to ISA bus 540. Alternatively, many I/O devices can be accommodated by a super I/O controller (not shown) attached to ISA bus 540.

BIOS 580 is coupled to ISA bus 540, and incorporates the necessary processor executable code for a variety of low-level system functions and system boot functions. BIOS 580 can be stored in any computer readable medium, including magnetic storage media, optical storage media, flash memory, random access memory, read only memory, and communications media conveying signals encoding the instructions (e.g., signals from a network). In order to attach computer system 501 to another computer system to copy files over a network, LAN card 530 is coupled to PCI bus 525 and to PCI-to-ISA bridge 535. Similarly, to connect computer system 501 to an ISP to connect to the Internet using a telephone line connection, modem 575 is connected to serial port 564 and PCI-to-ISA Bridge 535.

While the computer system described in FIG. 5 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for preempting tasks performed by a processor in a computer system, said method comprising:
   configuring, by a user of the computer system, a preempt value, and storing the preempt value in a memory accessible by the processor;
   receiving, from the user, a range of priorities selected from a plurality of possible priorities, wherein the queuing is only performed when the new task priority and the current task priority are each within the range of priorities; and
   after the configuring:
      receiving a request from a new task, wherein the new task includes a new task priority;
      comparing the new task priority to a current task priority, the current task priority corresponding to a current task currently being serviced by the processor;
      preempting the current task in favor of the new task in response to the new task priority being better than the current task priority by an amount greater than or equal to the preempt value;
      queuing the new task in response to the new task priority not being better than the current task priority by the preempt value;
      determining that the new task priority is better than the current task priority but not by the amount that is greater than or equal to the preempt value;
      queuing the new task in a favorable queue position in response to the determination, wherein the favorable queue position is in front of any queued tasks with worse priorities than the new task.

2. The method of claim 1 wherein higher priority numbers are better than lower priority numbers.

3. The method of claim 1 wherein lower priority numbers are better than higher priority numbers.

4. The method of claim 1 wherein the user is a system administrator.

5. The method of claim 1 further comprising:
   queuing the new task in a queue selected from a plurality of queues, wherein the plurality of queues correspond to a plurality of priorities and wherein the selected queue corresponds to the new task priority.

6. The method of claim 5 further comprising:
   selecting a queued task from the highest priority queue that is not empty in response to the processor no longer servicing the current task.

* * * * *